United States Patent
Reddmann et al.

(10) Patent No.: US 10,400,859 B2
(45) Date of Patent: Sep. 3, 2019

(54) MINIATURE DRIVE FOR AUTOMOBILE LOCKS WITH RUNNING DIRECTION LOCK

(71) Applicant: Kiekert Aktiengesellschaft, Heiligenhaus (DE)

(72) Inventors: Uwe Reddmann, Essen (DE); Milan Koubek, Pardubice (CZ); Manfred Janz, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 521 days.

(21) Appl. No.: 14/890,709

(22) PCT Filed: Apr. 28, 2014

(86) PCT No.: PCT/DE2014/000218
§ 371 (c)(1),
(2) Date: Dec. 29, 2015

(87) PCT Pub. No.: WO2014/180459
PCT Pub. Date: Nov. 13, 2014

(65) Prior Publication Data
US 2016/0116024 A1    Apr. 28, 2016

(30) Foreign Application Priority Data

May 6, 2013    (DE) .......................... 10 2013 007 658

(51) Int. Cl.
*F16H 1/20*    (2006.01)
*F16D 41/02*   (2006.01)
(Continued)

(52) U.S. Cl.
CPC .............. *F16H 1/203* (2013.01); *E05B 81/48* (2013.01); *E05B 81/56* (2013.01); *F16D 3/10* (2013.01);
(Continued)

(58) Field of Classification Search
CPC ............................... F16H 1/203; F16D 41/076
See application file for complete search history.

(56) References Cited

U.S. PATENT DOCUMENTS 2,737,274 A    3/1956  Mouravieff
2,812,839 A   11/1957  Cobb
(Continued)

FOREIGN PATENT DOCUMENTS

DE    1500366 B1    5/1970
DE    19747211 A1   5/1999
(Continued)

OTHER PUBLICATIONS

Machine Translation of FR1442222A by Lexis Nexis Total Patent on Dec. 14, 2015.
(Continued)

*Primary Examiner* — Terence Boes
(74) *Attorney, Agent, or Firm* — Woodard, Emhardt, Henry, Reeves & Wagner, LLP

(57) ABSTRACT

The invention relates to miniature drives for use in automobile locks. A return of the mechanism once the lock is opened and the motor is shut down is prevented completely mechanically. For this purpose, the worm wheel is associated with a mechanically active locking element which allows first to slightly turn back the wheel to unlock and reduce the load on the mechanism, but then prevents any further rotation against the direction of drive.

16 Claims, 4 Drawing Sheets

(51) Int. Cl.
- *F16D 41/07* (2006.01)
- *F16D 41/12* (2006.01)
- *F16D 41/20* (2006.01)
- *E05B 81/48* (2014.01)
- *E05B 81/56* (2014.01)
- *F16D 3/10* (2006.01)
- *F16D 43/02* (2006.01)
- *E05B 81/06* (2014.01)
- *E05B 81/34* (2014.01)

(52) U.S. Cl.
CPC .......... *F16D 41/02* (2013.01); *F16D 41/076* (2013.01); *F16D 41/125* (2013.01); *F16D 41/206* (2013.01); *F16D 43/02* (2013.01); *E05B 81/06* (2013.01); *E05B 81/34* (2013.01)

(56) References Cited

U.S. PATENT DOCUMENTS

| | | | |
|---|---|---|---|
| 2,998,874 A | 9/1961 | MacNeill | |
| 3,311,204 A * | 3/1967 | Barnard | F02C 7/105 165/10 |
| 3,321,986 A | 5/1967 | Chappell et al. | |
| 3,946,843 A | 3/1976 | Downs | |
| 5,597,057 A | 1/1997 | Ruth et al. | |
| 5,678,668 A | 10/1997 | Sink | |
| 6,155,124 A | 12/2000 | Wirths | |
| 6,371,536 B1 | 4/2002 | Koerwer | |
| 2001/0030426 A1 | 10/2001 | Kachouh | |
| 2003/0183473 A1 * | 10/2003 | Jensen | F16D 41/076 192/45.1 |
| 2007/0237035 A1 | 10/2007 | Helfer et al. | |

FOREIGN PATENT DOCUMENTS

| | | |
|---|---|---|
| DE | 19906997 A1 | 8/2000 |
| EP | 1130198 A2 | 9/2001 |
| EP | 1843225 A1 | 10/2007 |
| FR | 1442222 A | 6/1966 |

OTHER PUBLICATIONS

German Office Action issued in related DE102013007658.7 dated Mar. 12, 2014.

* cited by examiner

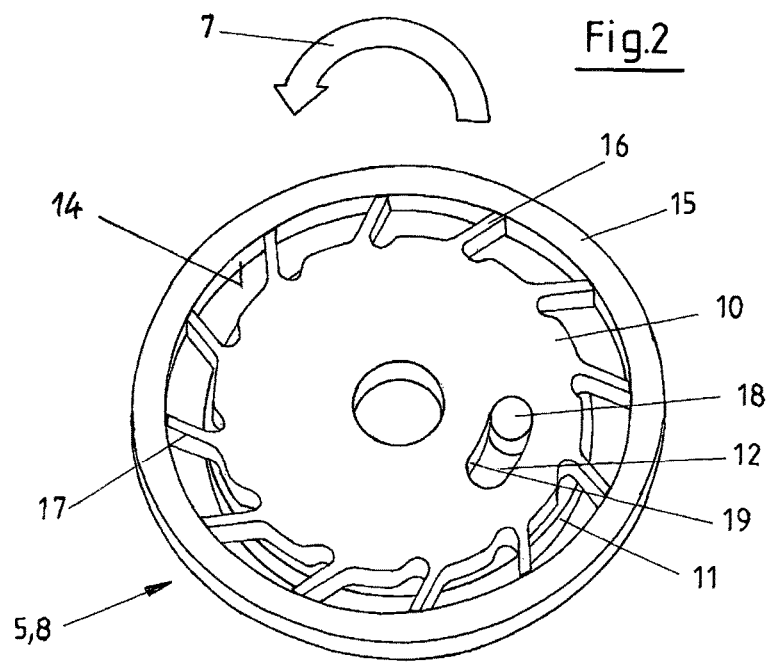
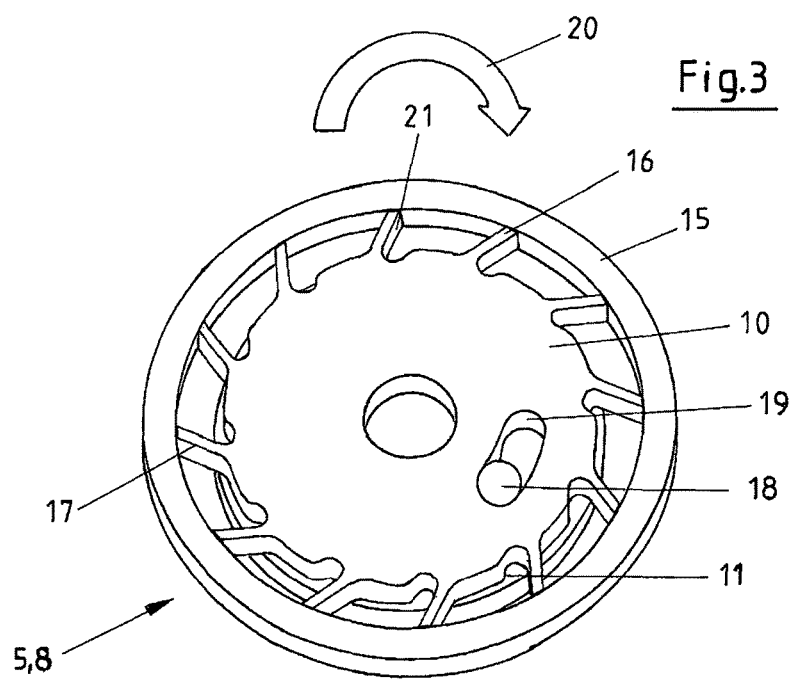

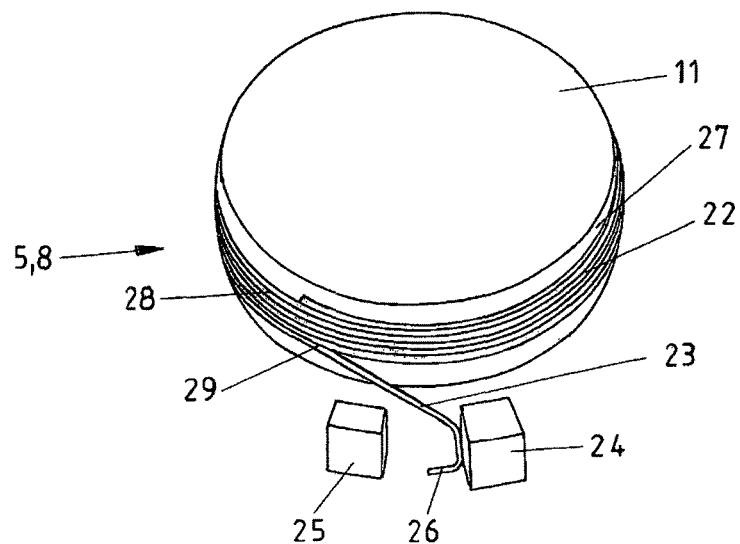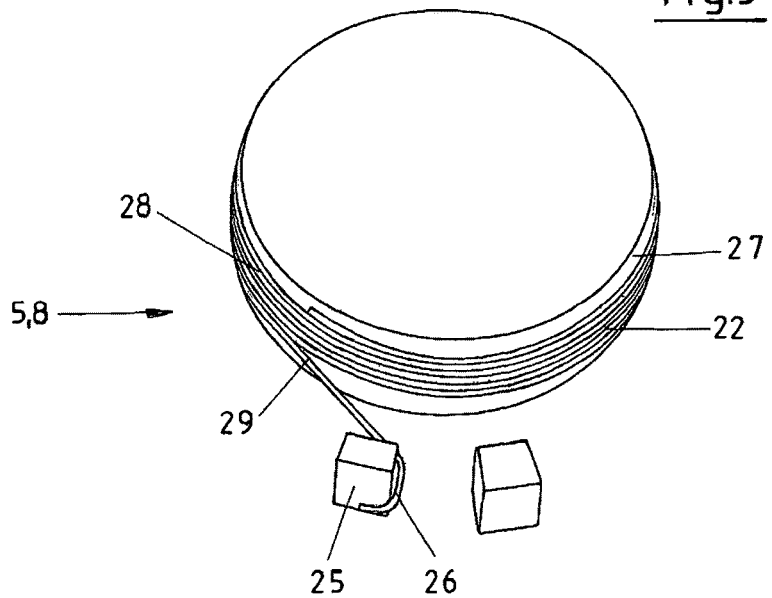

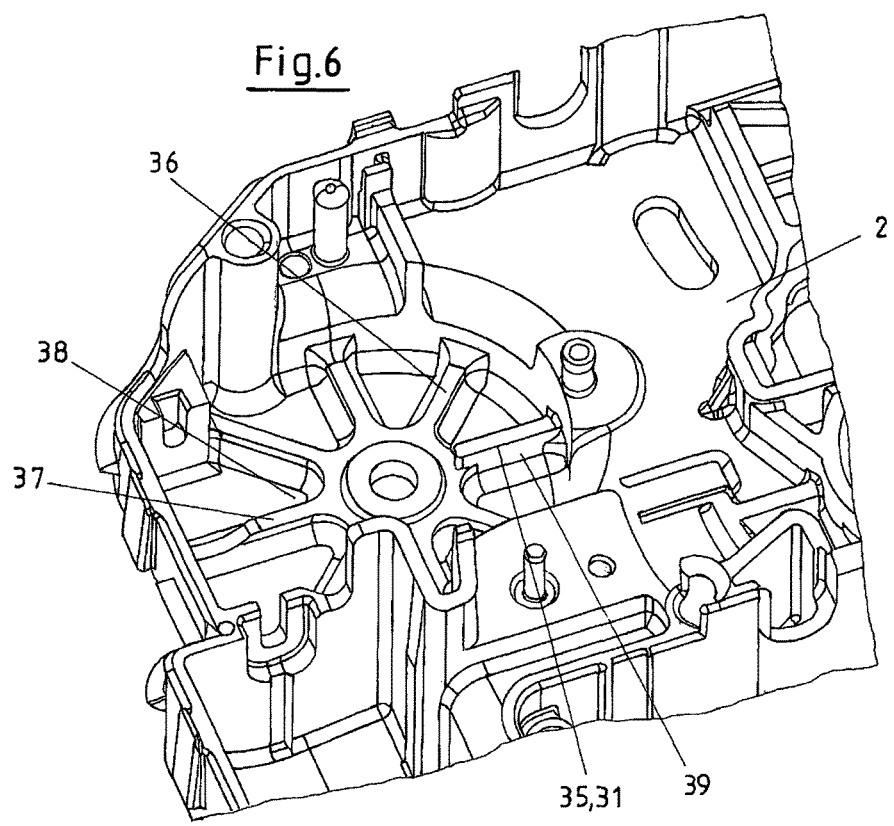
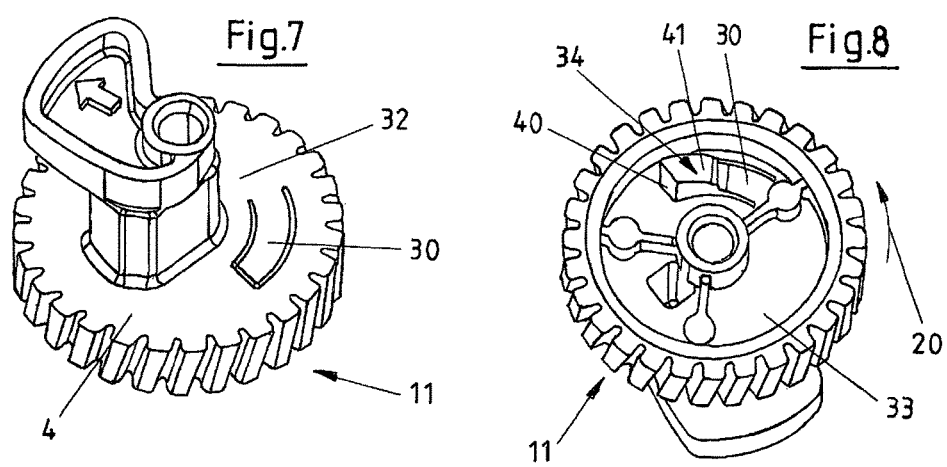

MINIATURE DRIVE FOR AUTOMOBILE LOCKS WITH RUNNING DIRECTION LOCK

CROSS-REFERENCE TO RELATED APPLICATIONS

This application is the U.S. national stage application of International Patent Application No. PCT/DE2014/000218, filed Apr. 28, 2014, which claims priority of German Application No. 10 2013 007 658.7, filed May 6, 2013, which are both hereby incorporated by reference.

BACKGROUND

The invention relates to a microdrive for the activation of latches with a gear assigned to the latch housing with a worm drive wheel and a motor which has a lock which prevents the gear from rolling back.

In drives for the electrical opening of latches, especially in microdrives, for cost reasons motors are predominantly energized in such a way that they can drive the gear with the worm drive wheel in a single direction. A resetting of the gear after depletion of the energization of the motor is not desired, it would impede the continued running of the microdrive. As the known gears, at least in part, are spring-loaded, the worm gear wheels of the gear are reset without a lock after switch-off the power and the drive. As stated, this is disadvantageous and undesirable. For generally known microdrives, the rolling back of the gear against the drive direction is prevented by a free-wheel diode being attached to the motor, by means of which the motor is short-circuited and thus brakes when rolling back. This prevents the voltages arising upon switch-off of the motor and the rolling back impelled by the gear having a negative impact. The direction of the voltage arising results according to the Lenzschen rule. The free-wheel diode prevents the induced power on the switching element, i.e. the motor, generating a high voltage and endangering the motor in certain circumstances. While the free-wheel diodes used are a cost-effective component in principle, the necessary soldering process and the making available of the materials for soldering of the free-wheel diode is extremely expensive. Consequently, a solution is sought here.

SUMMARY

The basis of the invention is therefore the task of creating microdrives for latches in which the rolling back of the gear can specifically be prevented without short-circuiting the motor.

According to the invention, the task is solved by the lock being a mechanically operational locking part and the gear with a wormgear wheel being a locking part which facilitates slight rolling back which is then designed to prevent further rotation in a direction opposite to the drive direction.

Such a mechanical solution can be mounted without soldering work and other costly additional work. Consequently, the manufacturing costs of the microdrive are not further burdened. As this mechanical solution permits slight rolling back, the gear can advantageously destress. Consequently, it is automatically in the correct operational position the next time the motor responds. After the destressing of the gear, the lock is completely effective. Consequently, the disadvantageous stresses of the motor can no longer occur and the free-wheel diode is completely superfluous.

According to an expedient execution form of the invention, it is envisaged that a clamping wheel assigned to the gear is envisaged as a lock which is designed to prevent the drive wheel assigned to the motor rolling back by clamping. Thus, a fully mechanical braking of the drive wheel or the wormgear wheel or the entire gear occurs, whereby it is especially advantageous that a clamping wheel designed in such a way only constitutes a slight additional stress also in relation to the material expense. This clamping wheel can be designed in such a way that as necessary an initially slight rolling back is possible which is facilitated in particular by a freewheeling function being integrated into the clamping wheel.

The necessary braking is always safely attainable, if as envisaged in accordance with the invention the clamping wheel has a spring arm conducted in a ring section which is designed in the drive direction to permit the rotation of a drive wheel assigned to the gear with low friction and to prohibit rotation in the reverse rotation direction. Such a clamping wheel, consisting of the ring section and the spring arms is expediently equipped with a multitude of such spring arms, for example twelve such spring arms, which protrude over the actual body of the clamping wheel against the drive direction and rub on the interior of the ring section with its braking face. Consequently, when the direction of rotation is changed they automatically jam and decelerate the clamping wheel accordingly and prevent further rotation.

In order to attain freewheeling, the invention envisages that the clamping wheel and the drive wheel are connected via a cam assigned to the drive wheel which is conducted in a pitch circle-shaped ring gap of the clamping wheel. The shape or the length of the ring gap then simulates the area which the drive wheel can execute in the reverse direction of revolution before the braking effect of the clamping wheel fully sets in.

Another expedient execution of the present invention is that in which a clamping wheel assigned to the gear is envisaged as a lock which is designed as the wrap springs encompassing the drive wheel and permits a prescribed destressing of the gear. Such wrap springs are basically known, whereby here a special execution is envisaged and necessary which ensures the destressing of the gear before the clamping effect is realized. It is advantageous in particular that two rotating parts are not required with such a wrap spring, but only the drive wheel itself which becomes effective due to the comprehensive wrap spring then with changeover of the rotational direction.

This destressing of the gear is facilitated in particular by the wrap spring demonstrating a hook component end protruding over the drive wheel which acts against a lock block causing slight friction on the drive wheel in the drive direction and is thus designed to press on the coils of the wrap spring on the external edge of the drive wheel upon rolling back with the hook aperture encompassing a further lock block.

While one end of the wrap spring is firmly connected to the drive wheel, the other end of the hook component with the hook aperture protrudes over the drive wheel. Consequently, it can correspond with the stated lock blocks. During the reliable operation of the drive wheel in the drive direction this protruding hook component end is supported on the first lock block without being able to be fixed. Advantageously, the wrap spring 'opens' slightly in the process. Consequently, only slight friction is applied on the external edge of the drive wheel in the drive direction. If the opening process is now changed and the gear attempts to impact on the motor in a reverse rotation direction, the hook component end with the hook aperture is moved to the second lock block and fixed there in such a way that the wrap spring wraps around the drive wheel, whereby the individual coils of the wrap spring are pressed firmly onto the external edge of the drive wheel. After a short destressing of the gear, the operating point is then attained where the wheel(s) of the gear continue to move or the motor is impacted. The time for the destressing of the gear can be set via the change to the two blocks.

The present invention envisages a further possible solution in that the gear demonstrates a wormgear wheel with a spring lip which is correspondingly designed with a lock surface in the latch housing. This solution demonstrates the advantage that, in addition to the wormgear wheel, further components are not required but that the wormgear wheel itself ensures the relevant braking of the gear due to its design. The spring lip is assigned to the wormgear wheel and the corresponding lock surface to the latch housing. Naturally, a reverse configuration is also conceivable.

Expediently there is a further design of the invention in which the spring lip is inserted into the internal blade of the wormgear wheel and equipped with a lock block on the underside. Thus, the spring lip can easily interact with the latch housing or the designed corresponding lock surface. This lock block is shaped in such a way that it demonstrates a bevel for movement in the drive direction, while a vertical lock surface is specified in the reverse revolution direction which then bumps against the lock surface in the latch housing if the wormgear wheel is moved in the reverse revolution direction. The wormgear wheel is blocked.

In order to prevent time-consuming work to the latch housing, it is advantageous if the lock surface is designed with a stay spoke to replace or complement the wormgear wheel and the remaining stay spokes protrude accordingly. For example, this must be attained by a recess being envisaged in the remaining stay spokes into which a locking part with a lock surface is inserted which is suitable and configured for deceleration of the wormgear wheel or for blockage of the lock block of the spring lip.

The invention is distinguished in particular by a microdrive being provided which has a purely mechanical impact on the gear of such a microdrive in order to destress the gear, but then to safely prevent further rolling back. Several possible solutions are prescribed for this purpose, one in the form of a drive and a clamping wheel which interact in such a way that they are practically without impact in the drive direction, while an effective blockade of the gear is attained in the reverse rotation direction. A further option works with a wrap spring which impacts the drive wheel in such a way that it can move practically without impediment in the drive direction, while in the reverse rotation direction it only decelerates slightly in the first instance, but then completely. Then a further design envisages that the lock is integrated straight into the wormgear wheel. It therefore does not require additional components, apart from the lock surface or the locking part assigned to the latch housing which interacts with the lock block of the spring lip and can ensure braking and then stoppage of the gear in the reverse revolution direction.

Further details and advantages of the object of the invention result from the following description of the pertaining sketch in which a preferred design example is outlined with the necessary details and individual parts. The following are shown:

BRIEF DESCRIPTION OF THE DRAWINGS

FIG. 2 a lock in the form of a clamping wheel and a drive wheel running in the drive direction, FIG. 3 the same component moving in the reverse revolution direction, FIG. 4 a drive wheel with a wrap spring rotating in the drive direction, FIG. 5 the component in accordance with FIG. 4 moving in the reverse rotation direction, FIG. 6 a partial area of a latch housing with the insert for the wormgear wheel, FIG. 7 a top view of the wormgear wheel and FIG. 8 a bottom view of the same wormgear wheel.

DETAILED DESCRIPTION OF THE DRAWINGS

Figure 1:
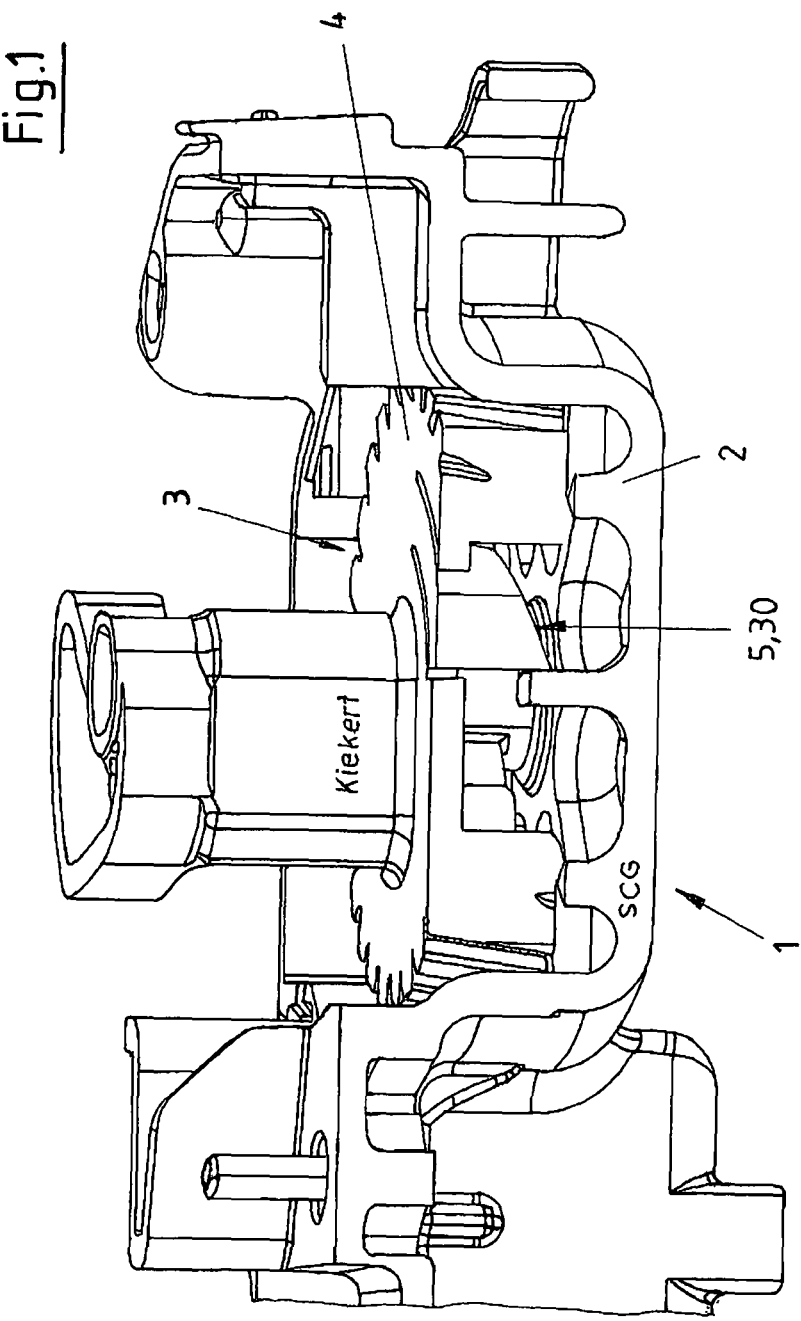
FIG. 1 an opened latch housing with a wormgear wheel and a lock for the motor.

FIG. 1 shows a partial view of a microdrive 1, whereby in the latch housing 2 the gear 3 is positioned with the wormgear wheel 4. The mechanical lock 5, namely in the form of the spring lip to be explained below 30 is only hinted at here.

FIG. 2 and FIG. 3 show the design of a lock 5 in the form of a mechanical locking component 8, consisting of a clamping wheel 10 and the drive wheel 11 working with it. The drive wheel 11 and the clamping wheel 10 are connected via a freewheel 12, which is explained below.

In the sketch in FIG. 2 the clamping wheel 10 and the drive wheel 11 move in the drive direction 7, i.e. the motor vehicle latch not described in greater detail here is opened via the microdrive 1. The drive wheel 11 via its cam 18 takes with it the clamping wheel 10, which possesses the aforementioned spring arm 16, 17. The spring arms grind on the interior 14 of the depicted ring component 15. To this end, they are equipped with adjacent braking surfaces 21, whereby these braking surfaces 21 ensure that upon revolution of the drive wheel 11 in the reverse revolution direction 20 (depicted in FIG. 3) these braking surfaces 21 and the spring arms 16, 17 ensure that the clamping wheel 10 decelerates and then stops. Consequently, via the cam 18, which leads in the ring gap 19 it is ensured that the drive wheel 11 also stops when freewheeling has ended 12. Thus, the destressing of the gear 3 is ensured and thereafter the hazardous determination of the wormgear wheel 4 and thus the motor. Such a lock 5 for a microdrive works purely mechanically, hardly requires additional parts and is simple to mount as desired.

In the design visible from FIGS. 4 and 5 of block 5 work also takes place again with a mechanical locking component 8.

In the design according to FIGS. 4 and 5 the drive wheel 11 is assigned to a wrap spring 22, which with its coils 28, 29 can have a facilitating or preventative effect on the rotation of the external edge 27 of the drive wheel 11 dependent on the rotation direction. This is attained by the wrap spring having a free, protruding hook component end 23 which bumps against the lock block 24 in the drive direction 7 (FIG. 4) and thus enables slight "opening" of the wrap spring 22. The hook aperture 26 cannot be effective in relation to the lock block 24. However, this is the case if the hook aperture 26 encompasses the lock block 25 when the drive wheel 11 is rotated in the reverse rotation direction. This ensures that now the forces arising can be effectively controlled and the coils 28, 29 are impacted and stressed in such a way that they press closely on the external edge 27 of the drive wheel 11 and can thus ensure deceleration and stoppage of the drive wheel.

The partial view of the lock housing 2 shows the place where the insert 38 is envisaged for the wormgear wheel 4.

This insert 38 is identified by several stay spokes 35, 36, 37, on which the drive wheel 11 shown in FIGS. 7 and 8 can be supported during operation of the microdrive 1. One of these stay spokes 35 recognizably shows a raised area which is described here as a lock surface 31. Braking of the drive wheel 11 can be ensured via this protruding spoke component 39 with the bulky area 31 in the reverse revolution direction 20. To this end, the drive wheel 11 has a spring lip 30 in the internal blade 32 with a lock block 34 recognizable on the underside 33 (FIG. 8). The locking edge 40 of the lock block 34 bumps against the lock surface 31 during operation of the drive wheel 12 in the reverse rotation direction 20 and also with simple raising of the spoke component 39. Consequently, the desired deceleration of the drive wheel 11 occurs. In the reverse revolution direction of the drive wheel 11 the spoke component 39 slides over the inclined sliding surface 41 of the lock block 34. Consequently, impairments cannot occur here, whereby it must also be taken into consideration that a springing effect is ensured due to the spring lip 30.

All stated characteristics, including those taken from the sketches alone, are viewed as crucial to the invention alone and jointly.

The invention claimed is:

1. A microdrive for the activation of motor vehicle latches, the microdrive comprising:
   a worm drive wheel and a motor, wherein the worm drive wheel is rotatable in a drive direction and an opposite direction,
   a clamping wheel coupled to the worm drive wheel such that the clamping wheel rotates with the worm drive wheel,
   a lock which resists the worm drive wheel from rotating in the opposite direction, wherein the lock is a mechanically effective locking part and the worm drive wheel is a locking part enabling slight rolling back in the opposite direction which prevents further rotation in the opposite direction, and
   a wrap spring encompassing the drive wheel and permitting a prescribed destressing of the gear, wherein the wrap spring comprises a hook component end protruding over the drive wheel which acts against a lock block causing slight friction on the drive wheel in the drive direction and is thus designed to press the coils of the wrap spring on the external edge of the drive wheel upon rolling back with the hook aperture defining a further lock block.

2. The microdrive in accordance with claim 1, further comprising a freewheel that is integrated into the clamping wheel.

3. The microdrive in accordance with claim 1, wherein the clamping wheel has a spring arm led in a ring section which is designed in the drive direction to permit the rotation of a drive wheel assigned to the gear with low friction and to prohibit rotation in the reverse rotation direction.

4. The microdrive in accordance with claim 3, wherein the clamping wheel is connected to the drive wheel via a cam assigned to the drive wheel which is led in a pitch circle-shaped ring gap of the clamping wheel.

5. The microdrive in accordance with claim 1, wherein the worm drive wheel further comprises a spring lip, which is correspondingly designed with a lock surface in the latch housing.

6. The microdrive in accordance with claim 5, wherein the spring lip is inserted into an internal blade of the wormgear wheel and is equipped with a lock block on the underside.

7. The microdrive in accordance with claim 5, wherein the locking surface is designed with a protruding spoke to replace or complement the wormgear wheel.

8. The microdrive in accordance with claim 7, further comprising a plurality of stay spokes which protrude less than the protruding spoke protrudes.

9. A microdrive for the activation of motor vehicle latches, the microdrive comprising:
   a worm drive wheel and a motor, wherein the worm drive wheel is rotatable in a drive direction and an opposite direction,
   a clamping wheel coupled to the worm drive wheel such that the clamping wheel rotates with the worm drive wheel,
   a lock which resists the worm drive wheel from rotating in the opposite direction, wherein the lock is a mechanically effective locking part and the worm drive wheel is a locking part enabling slight rolling back in the opposite direction which prevents further rotation in the opposite direction,
   wherein the worm drive wheel comprises a ring section that defines an interior and wherein the clamping wheel comprises a plurality of spring arms that rub against the interior and generate a braking force when the worm drive wheel rotates in the opposite direction.

10. The microdrive in accordance with claim 1, wherein the clamping wheel comprises a multitude of spring arms that rub against the interior.

11. The microdrive in accordance with claim 4, wherein the worm drive wheel comprises a ring section that defines an interior and wherein the clamping wheel comprises a plurality of spring arms that rub against the interior and generate a braking force when the worm drive wheel rotates in the opposite direction.

12. A microdrive for the activation of motor vehicle latches, the microdrive comprising:
   a worm drive wheel and a motor, wherein the worm drive wheel is rotatable in a drive direction and an opposite direction,
   a clamping wheel coupled to the worm drive wheel such that the clamping wheel rotates with the worm drive wheel,
a lock which resists the worm drive wheel from rotating in the opposite direction, wherein the lock is a mechanically effective locking part and the worm drive wheel is a locking part enabling slight rolling back in the opposite direction which prevents further rotation in the opposite direction,
   wherein the clamping wheel defines a pitch circle-shaped ring gap and wherein the drive wheel comprises a cam that is positioned in the pitch circle-shaped ring gap and wherein the pitch circle-shaped ring gap limits movement of the cam thereby limiting rotation of the drive wheel relative to the clamping wheel.

13. The microdrive in accordance with claim 12, wherein the worm drive wheel comprises a ring section that defines an interior and wherein the clamping wheel comprises a plurality of spring arms that rub against the interior and generate a braking force when the worm drive wheel rotates in the opposite direction.

14. The microdrive in accordance with claim 1, wherein the worm drive wheel comprises a ring section that defines an interior and wherein the clamping wheel comprises a plurality of spring arms that rub against the interior and generate a braking force when the worm drive wheel rotates in the opposite direction.

15. The microdrive in accordance with claim 1, wherein the clamping wheel defines a pitch circle-shaped ring gap and wherein the drive wheel comprises a cam that is positioned in the pitch circle-shaped ring gap and wherein the pitch circle-shaped ring gap limits movement of the cam thereby limiting rotation of the drive wheel relative to the clamping wheel.

16. The microdrive in accordance with claim 15, wherein the worm drive wheel comprises a ring section that defines an interior and wherein the clamping wheel comprises a plurality of spring arms that rub against the interior and generate a braking force when the worm drive wheel rotates in the opposite direction.

* * * * *